US011652544B2

United States Patent
Eiselt et al.

(10) Patent No.: US 11,652,544 B2
(45) Date of Patent: May 16, 2023

(54) CORRELATION OPTICAL TIME DOMAIN REFLECTOMETRY METHOD AND SYSTEM

(71) Applicant: ADVA Optical Networking SE, Meiningen (DE)

(72) Inventors: Michael Eiselt, Kirchheim (DE); Mirko Lawin, Meiningen (DE); Florian Azendorf, Meiningen (DE)

(73) Assignee: ADVA Optical Networking SE, Meiningen (DE)

( * ) Notice: Subject to any disclaimer, the term of this patent is extended or adjusted under 35 U.S.C. 154(b) by 292 days.

(21) Appl. No.: 17/164,927

(22) Filed: Feb. 2, 2021

(65) Prior Publication Data

US 2021/0242936 A1   Aug. 5, 2021

(30) Foreign Application Priority Data

Feb. 3, 2020   (EP) ................... 20155220

(51) Int. Cl.
*H04B 10/071* (2013.01)
*H04B 10/50* (2013.01)

(52) U.S. Cl.
CPC ........... *H04B 10/071* (2013.01); *H04B 10/50* (2013.01)

(58) Field of Classification Search
CPC .............................. H04B 10/071; H04B 10/50
See application file for complete search history.

(56) References Cited

U.S. PATENT DOCUMENTS

| 7,630,641 B1* | 12/2009 | Uhlhorn | H04B 10/071 398/28 |
| 2015/0063823 A1* | 3/2015 | Eiselt | H04L 27/04 398/186 |
| 2018/0259422 A1 | 9/2018 | Castro et al. | |
| 2019/0379451 A1 | 12/2019 | Eiselt | |

OTHER PUBLICATIONS

Sandstrom et al., "High Performance, In-service Correlation OTDR" in Optical Fiber Communication Conference/National Fiber Optic Engineers Conference, Technical Digest, 2013, p. 1-3, Optical Society of America.

* cited by examiner

*Primary Examiner* — Jonathan M Hansen
(74) *Attorney, Agent, or Firm* — The Webb Law Firm (57) ABSTRACT

The present disclosure relates to an optical time domain reflectometry method including the steps of feeding a plurality of unipolar optical probe signals to a near end of an optical path under test, receiving a corresponding plurality of reflected unipolar optical receive signals, creating a corresponding plurality of digital receive data signals, calculating at least one correlation signal by correlating the digital receive data signals with a bit sequence corresponding to a respective probe bit sequence, and determining the signal propagation delay between the near end of the optical path and a respective reflective position. The present disclosure also relates to an optical time domain reflectometry system in which this method is implemented and a computer program having instructions to cause the optical time domain reflectometer and to execute the method herein.

20 Claims, 5 Drawing Sheets

Table 1

| | probe signal portion | | | | | | | fill signal portion | | | | | | | | | | |
|---|---|---|---|---|---|---|---|---|---|---|---|---|---|---|---|---|---|---|
| (1) TX / fill | 0 | 1 | 1 | 1 | 0 | 0 | 0 | 0 | 1 | 1 | 1 | 1 | 1 | 1 | 1 | 1 | 1 | 0 |
| (2) TX / inverse fill | 0 | 1 | 1 | 0 | 0 | 0 | 0 | 0 | 0 | 0 | 0 | 0 | 0 | 0 | 0 | 0 | 1 | 0 |
| (3) Sum (1)+(2) | 0 | 2 | 2 | 2 | 0 | 0 | 0 | 0 | 1 | 1 | 1 | 1 | 1 | 1 | 1 | 1 | 0 | 0 |
| (4) Corr w/ TX | 0 | -2 | -4 | -2 | 0 | 8 | -1 | 0 | 1 | -3 | 0 | 0 | 0 | 0 | 0 | 0 | 0 | 0 |

Table 2

| (1) Golay A / fill | ... | 0 | 1 | 0 | 1 | 1 | 1 | 0 | 0 | 0 | 1 | 0 | 1 | 0 | 1 | 0 | 1 |
|---|---|---|---|---|---|---|---|---|---|---|---|---|---|---|---|---|---|
| (2) inv. Golay A / fill | ... | 1 | 0 | 1 | 0 | 0 | 0 | 1 | 1 | 1 | 0 | 1 | 0 | 1 | 0 | 1 | 0 |
| (3) Difference (1)-(2) | ... | -1 | 1 | -1 | 1 | 1 | 1 | -1 | -1 | -1 | 1 | -1 | 1 | -1 | 1 | -1 | 1 |
| (4) Corr. Of (3) w/ Golay A | ... | 0 | 0 | -1 | 0 | -3 | 0 | 1 | 8 | -1 | 0 | 0 | 0 | 0 | 0 | 0 | 16 |
| (5) Golay B / fill | ... | 0 | 1 | 0 | 1 | 1 | 1 | 0 | 0 | 1 | 0 | 1 | 0 | 1 | 0 | 1 | 0 |
| (6) inv. Golay B / fill | ... | 1 | 0 | 1 | 0 | 0 | 0 | 1 | 1 | 0 | 1 | 0 | 1 | 0 | 1 | 0 | 1 |
| (7) Difference (5)-(6) | ... | -1 | 1 | -1 | 1 | 1 | 1 | -1 | -1 | 1 | -1 | 1 | -1 | 1 | -1 | 1 | -1 |
| (8) Corr. Of (7) w/ Golay B | ... | 1 | 0 | 1 | 0 | 3 | 0 | -1 | 8 | 1 | 0 | 0 | 0 | 0 | 0 | 0 | 0 |
| (9) Sum of Corr. (4)+(8) | ... | 0 | 0 | 0 | 0 | 0 | 0 | 0 | 16 | 0 | 0 | 0 | 0 | 0 | 0 | 0 | 0 |

Fig. 5

Table 3

| (1) Golay A / fill | ... | 0 | 1 | 0 | 1 | 1 | 1 | 0 | 0 | 0 | 1 | 0 | 1 | 0 | 1 | 0 | 1 |
|---|---|---|---|---|---|---|---|---|---|---|---|---|---|---|---|---|---|
| (2) Golay A / inv. fill | ... | 1 | 0 | 1 | 0 | 0 | 0 | 1 | 1 | 1 | 0 | 1 | 0 | 1 | 0 | 1 | 0 |
| (3) Sum (1)+(2) | ... | 1 | 1 | 1 | 1 | 1 | 1 | 1 | 1 | 1 | 1 | 1 | 1 | 1 | 1 | 1 | 1 |
| (4) Corr. of (3) w/ Golay A | ... | 0 | 0 | 0 | 0 | 2 | 2 | 0 | -1 | 1 | 2 | 0 | 1 | 1 | 1 | 1 | 4 |
| (5) Golay B / fill | ... | 0 | 1 | 0 | 1 | 1 | 1 | 0 | 0 | 1 | 0 | 1 | 0 | 1 | 0 | 1 | 0 |
| (6) Golay B / inv. fill | ... | 1 | 0 | 1 | 0 | 0 | 0 | 1 | 1 | 0 | 1 | 0 | 1 | 0 | 1 | 0 | 1 |
| (7) Sum (5)+(6) | ... | 1 | 1 | 1 | 1 | 1 | 1 | 1 | 1 | 1 | 1 | 1 | 1 | 1 | 1 | 1 | 1 |
| (8) Corr. of (7) w/ Golay B | ... | 4 | 4 | 4 | 4 | 5 | 4 | 4 | 7 | 3 | 2 | 4 | 3 | 1 | 1 | 1 | 4 |
| (9) Sum of Corr. (4)+(8) | ... | 4 | 4 | 4 | 4 | 4 | 4 | 4 | 4 | 4 | 4 | 4 | 4 | 4 | 4 | 4 | 4 |

Fig. 6

Table 4

| | | | | | | | | | | | | | | | | | |
|---|---|---|---|---|---|---|---|---|---|---|---|---|---|---|---|---|---|
| (1) | Golay A / fill | 1 | 0 | 1 | 1 | 1 | 0 | 0 | 0 | 1 | 0 | 1 | 1 | 1 | 0 | 1 | 1 |
| (2) | Golay A / inv. fill | 1 | 0 | 1 | 1 | 0 | 1 | 1 | 1 | 1 | 0 | 1 | 1 | 0 | 1 | 0 | 0 |
| (3) | Sum (1)+(2) | 2 | 0 | 2 | 2 | 1 | 1 | 1 | 1 | 2 | 0 | 2 | 2 | 1 | 1 | 1 | 1 |
| (4) | inv. Golay A / fill | 0 | 1 | 0 | 0 | 1 | 0 | 0 | 0 | 0 | 1 | 0 | 0 | 1 | 0 | 1 | 1 |
| (5) | inv. Golay A / inv. fill | 0 | 1 | 0 | 0 | 0 | 1 | 1 | 1 | 0 | 1 | 0 | 0 | 0 | 1 | 0 | 0 |
| (6) | Sum (4)+(5) | 0 | 2 | 0 | 0 | 1 | 1 | 1 | 1 | 0 | 2 | 0 | 0 | 1 | 1 | 1 | 1 |
| (7) | Diff. of Sums (3)−(6) | 2 | −2 | 2 | 2 | 0 | 0 | 0 | 0 | 2 | −2 | 2 | 2 | 0 | 0 | 0 | 0 |
| (8) | Corr. of (7) w/ Golay A | −2 | 0 | −2 | −6 | 0 | −2 | −2 | −6 | 2 | 16 | 2 | 0 | −2 | 0 | 0 | 0 |
| (9) | Golay B / fill | 1 | 0 | 1 | 1 | 1 | 0 | 0 | 0 | 1 | 0 | 1 | 1 | 1 | 0 | 1 | 1 |
| (10) | Golay B / inv. fill | 1 | 0 | 1 | 1 | 0 | 1 | 1 | 1 | 1 | 0 | 1 | 1 | 0 | 1 | 0 | 0 |
| (11) | Sum (9)+(10) | 2 | 0 | 2 | 2 | 1 | 1 | 1 | 1 | 2 | 0 | 2 | 2 | 1 | 1 | 1 | 1 |
| (12) | inv. Golay B / fill | 0 | 1 | 0 | 0 | 1 | 0 | 0 | 0 | 0 | 1 | 0 | 0 | 1 | 0 | 1 | 1 |
| (13) | inv. Golay B / inv. fill | 0 | 1 | 0 | 0 | 0 | 1 | 1 | 1 | 0 | 1 | 0 | 0 | 0 | 1 | 0 | 0 |
| (14) | Sum (12)+(13) | 0 | 2 | 0 | 0 | 1 | 1 | 1 | 1 | 0 | 2 | 0 | 0 | 1 | 1 | 1 | 1 |
| (15) | Diff. of Sums (11)−(14) | 2 | −2 | 2 | 2 | 0 | 0 | 0 | 0 | 2 | −2 | 2 | 2 | 0 | 0 | 0 | 0 |
| (16) | Corr. of (15) w/ Golay B | 2 | 0 | 2 | 6 | 0 | 2 | 2 | 6 | −2 | 16 | −2 | 0 | 2 | 0 | 0 | 0 |
| (17) | Sum of Corr. (8)+(16) | 0 | 0 | 0 | 0 | 0 | 0 | 0 | 0 | 0 | 32 | 0 | 0 | 0 | 0 | 0 | 0 |

Fig. 7

CORRELATION OPTICAL TIME DOMAIN REFLECTOMETRY METHOD AND SYSTEM

CROSS-REFERENCE TO RELATED APPLICATIONS

This application claims priority to European Patent Application No. 20155220.5 filed Feb. 3, 2020, the disclosure of which is hereby incorporated by reference in its entirety.

BACKGROUND OF THE INVENTION

Field of the Invention

The invention relates to an optical time domain reflectometry method using correlation comprising the features of the pre-characterizing portion as described herein and an optical time domain reflectometer using correlation comprising the features of the pre-characterizing portion as described herein.

Description of Related Art

At the optical front end of a correlation OTDR (optical time domain reflectometry) system, a data burst comprising a plurality of bits is transmitted and a continuous but varying power is received. Between the data bursts created by an optical transmitter, the optical power transmitted is turned off, i.e. a zero-level signal is transmitted for a duration corresponding to the round-trip time in the fiber (or, generally spoken, the optical path) under test. The data burst typically has a length of several hundred to a few thousand bits. In order to increase the resolution of correlation OTDR systems, the bit rate of up-to-date systems has been increased from 100 Mb/s or less up to 1 to 10 Gbit/s (i.e. the burst duration is between 10 nanoseconds and 10 microseconds), while the duration of the gap between the bursts for a 100-km fiber is approximately 1 millisecond. This on/off ratio, or duty cycle, of typically less than 1% leads to strong distortions in an optical transmitter that is AC-coupled or power-controlled, which is typically the case for pluggable transceivers, which are widely used for both telecommunication and data communication purposes.

Generally, an AC-coupled or power-controlled optical transmitter (usually a laser) cannot tolerate data patterns that differ far from a 1:1 duty cycle for an extended period of time. The standard laser driver circuitry includes an automatic power control (APC) loop and possibly AC coupling on the data inputs and the laser modulator output. Both AC coupling and the APC loop react critically to a large mark density imbalance (the term "mark density" refers to the ratio of ones to zeros in a data pattern or binary signal). AC coupling acts as a high-pass filter for the data that pass through the laser driver. If the mark density deviates from 50% for long enough, the low-frequency content of the data will fall below the cut-off frequency of this filter, causing signal distortion of the optical output signal.

Figure 1:
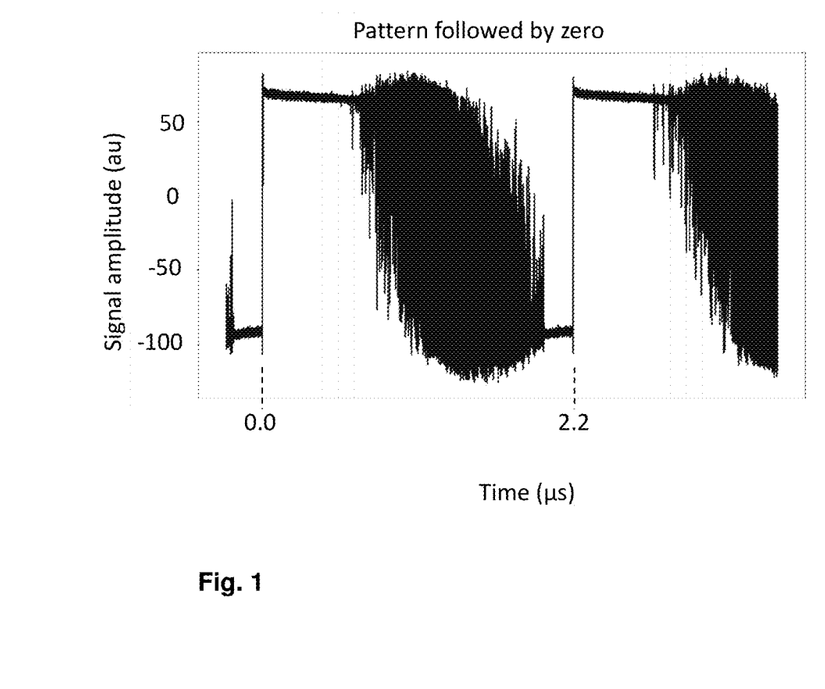
FIG. 1 shows a diagram of an optical output signal of an AC-coupled or power-controlled optical transmitter created by feeding an electrical burst signal to the input port.

This problem is illustrated in FIG. 1 which shows a series of probe signals created by an AC-coupled or power-controlled laser, wherein the curve represents the transmitter output signal created by using an electrical control signal that is AC-coupled to the transmitter. Each optical probe signal shown in FIG. 1 that is created by a respective electrical probe signal starts with a 2048-bit (unipolar) Golay sequence followed by 20,000 zeros at a bit rate of 10 Gbps (i.e. the on/off duty ratio is approximately 10%). The probe signal that is fully illustrated in FIG. 1 starts at $t=0$ μs and ends at $t=2,2048$ μs. As apparent from the course of this signal, the burst character of this signal leads to a completely distorted signal. During the 0.2048 μs of the 2048 bits of the probe bit sequence of the electrical probe signal, no bit modulation is visible. The signal amplitude increases step-like to an almost constant value and at around $t=1$ μs begins to fall back to the almost constant start value before $t=0$, while during the fall-back interval the signal amplitude shows an extremely noisy behavior.

These problems do not play a role for correlation OTDR systems which use a lower data rate (100 Mb/s or less) such that a sufficient number of bits in the data pattern reduces the requirement to transmit unacceptably long gaps between data bursts. For high-accuracy applications using Gbit/s rates, this would require very long bit patterns, which would create an unacceptably high effort for performing the correlation.

As an alternative, as also done for conventional OTDR, a special laser driver and control circuit could be used to enable burst operation.

Further, burst enabled pluggable transceivers are also available, but as they are mainly used for PON applications, the wavelengths available are limited and this type of pluggable receiver is more costly.

SUMMARY OF THE INVENTION

It is thus an object of the present invention to provide an optical time domain reflectometry method using correlation that can be used in connection with transceivers comprising AC-coupled or power controlled optical transmitters (especially lasers) and that achieves an increased accuracy and reduces the probability of erroneous measurement results. It is a further object of the invention to provide an optical time domain reflectometer using correlation, especially an optical time domain reflectometer that comprises an AC-coupled or power-controlled optical transmitter, which applies the method according to the invention. Finally, it is an object of the invention to provide a computer program configured to control an optical time domain reflectometer in such a way that this method is carried out.

The invention achieves these objects with the combinations of features as described herein. Further embodiments of the invention are apparent from the dependent claims.

The invention starts from the finding that distortions of the optical probe signal of an OTDR system that comprises an AC-coupled or power-controlled optical transmitter can be avoided or at least greatly reduced if each optical probe signal is created in such a way that it comprises, apart from a respective probe bit sequence portion, an optical fill signal portion of one or more differing types of optical signals, wherein each type of the optical fill signals has a bit pattern having no or a sufficiently small low-frequency component below a predetermined cut-off frequency. Of course, such an optical probe signal is created by using a corresponding electrical probe signal that is fed to a signal port of the optical transmitter.

In this way, distortions of the output signal, i.e. the optical probe signal, of the optical transmitter caused by changes of average power of the respective electrical probe signal can be avoided.

The bit pattern of each type of the optical fill signals may have essentially the same average value as the probe bit sequence comprised by the respective optical probe signal. In other words, each type of the optical fill signals may have a bit pattern the mark density of which does not differ from the mark density of the respective probe bit sequence by a predetermined value, the mark densities of the fill signal bit pattern and the probe bit sequence being determined over a time period corresponding to the inverse of a predetermined cut-off frequency. For example, the bit pattern of the optical fill signal is chosen such that the mark densities do not differ by more than +/−0.05. In this way, distortions caused by step-like changes of the average power of the electrical probe signal $TX_{el}$ between the consecutive probe signal and fill signal portions can be avoided.

Of course, the preferred mark density of the probe signal is 50% as many bit sequences that are suitable to be used as probe bit sequences, e.g. pseudo-random bit sequences (PRBS) or Golay sequences (see below), reveal a mark density of essentially 50%.

In order to avoid any distortions caused by a change of the average power or bit values of the electrical probe bit signals, it is preferred that the optical probe bit signals are created without any pause, i.e. without any time interval with a zero signal, between two consecutive probe signals or with a maximum pause which is so short that, depending on the properties of the DC-coupled or power-controlled optical transmitter, no burst-like noise is created following the optical probe signal.

The probe bit sequence may be comprised within the electrical (and, as a result, within the optical) probe signal at the beginning thereof or at any other position (including the end thereof). In case a (longer) pause is present between two consecutive probe signals, the length of the fill signal portion before and following the probe bit sequence must be so long that the optical transmitter reaches a state in which the remaining portion of the electrical probe signal is correctly converted into an optical probe signal. In this way, correlating the corresponding receive data signals with the probe bit sequence still leads to correct results. However, in order to reduce the measurement time, it is preferred to create the optical probe signals without any zero-signal pause.

According to the invention, two or more of the digital receive data signals or two or more averaged digital receive data signals are added or subtracted in order to form at least one sum signal comprising a resulting probe bit sequence portion and a resulting fil pattern portion, wherein the fill patterns of the respective fill signals are chosen in such a way that the at least one sum signal has a constant value (including zero) at each bit position of the fill signal portion. Of course, the digital receive data signals are created in such a way that each signal begins with the start of the respective optical (or electrical) probe signal (and ends at the latest before the start of the following optical probe signal) or comprises the same time span or window that has the same time distance from the start of the respective optical probe signal (i.e. windowing is applied). In other words, the digital receive data signals are created in such a way that they comprise the respective probe bit sequence at the same position.

The at least one correlation signal is obtained by correlating the at least one sum signal with a correlation bit sequence that corresponds to the one or more probe bit sequences comprised by the digital receive data signals that have been used to create the respective sum signal. "Correspond" in this context means that the correlation bit sequence is identical with the probe bit sequence if the sum signal is created by adding digital receive data signals which have been obtained with probe signals comprising identical probe bit sequences, and that the correlation bit sequence is identical with the probe bit sequence comprised by one of the probe signals if the sum signal is created by subtracting digital receive data signals which have been obtained with probe signals comprising probe bit sequences that are inverse with respect to each other.

According to an embodiment of the invention, the correlation bit sequence may be a bipolar bit sequence that is obtained by mapping the zeros of the respective probe bit sequence to minus one and the ones to one. This leads to the advantage that the value of the correlation signal is zero if the shift of the bipolar probe bit sequence versus the probe signal portion of the sum signal exceeds the length of the probe bit sequence, even if the values of the sum signal in the fill signal portion are constant but unequal to zero. In addition, using such a bipolar bit sequence leads to the advantage that the main (wanted) correlation peak may be enhanced (at least in case pairs of probe signal types are used that comprise inverted probe bit sequences, see below) and/or that the (unwanted) side peaks are damped (at least in case pairs of probe signal types are used that comprise identical probe bit sequences, see below).

According to an embodiment of the invention, the at least one correlation signal may be obtained by correlating each component of the at least one sum signal with the respective bipolar sequence and, taking into account the positive or negative sign of the components, adding the respective partial correlation signals instead of first obtaining the at least one sum signal and then correlating the at least one sum signal with the respective bipolar bit sequence. This is possible as the cross-correlation operation is associative and distributive. However, as the correlation operation causes a higher computation effort, this embodiment may be used for specific applications only.

As already mentioned above, each optical probe signal may comprise the probe bit sequence in a first portion (i.e. the probe signal starts with the probe bit sequence) and the fill signal in a succeeding portion, i.e the probe signal portion is followed by the fill signal portion. Further, as already explained above, the optical probe signals may be fed to the near end of the optical path under test as a continuous series of signals.

According to a preferred embodiment, the bit pattern of each of the one or more types of optical fill signals comprises alternating groups of zeros and ones, wherein each group comprises an identical number of only zeros or only ones. For example, the fill signal portion may comprise the bit patterns 10101010, 110011001100 or 111000111000 etc., or the respective inverse pattern (i.e. each 1 bit is replaced by a 0 bit and vice versa).

According to a further embodiment (this method shall be designated in the following as "basic sum method"), each of a first number of optical probe signals comprises a probe bit sequence of a predetermined type and a fill signal of a first type, and each of a second number of optical probe signals comprises a probe bit sequence of the identical type and a fill signal of a second type, wherein the fill signal of the second type is equal to the bitwise inverted fill signal of the first type. In this embodiment, a sum signal can be created by bitwise averaging the first number of digital receive data signals and bitwise averaging the second number of digital receive data signals and bitwise adding the two averaged signals. In case of identical first and second numbers of optical probe signals, the sum signal can also be created by bitwise adding the first and second numbers of digital receive data signals. In any of these alternatives, the sum signal comprises a fill signal portion that, due to the inverse fill patterns, comprises a zero signal (provided an ideally correct detection of the receive data signal is given). The sum signal is then correlated with a bipolar version of the probe bit sequence and this correlation signal is used as at least one correlation signal for determining the signal propagation delay between the near end of the optical path and the at least one reflective position. Of course, a plurality of values for the signal propagation delay can be determined in this way and the accuracy can be increased by averaging these values. Such an increase in the accuracy can of course be achieved in all embodiments, irrespective of the manner how the values for the signal propagation delay is determined.

It shall be mentioned that oversampling may be used to create the digital receive data signals and that, in this case, the bipolar probe bit sequence may consist of a respective "oversampled" bit sequence, i.e. each bit may be represented by a respective number of identical 1 or −1 values.

As the fill signal portion of the sum signal in these embodiments comprises a zero fill signal, the correlation signal is also zero if the shift of the bipolar probe bit sequence versus the probe signal portion of the sum signal exceeds the length of the probe bit sequence.

The method according to the embodiments explained above using inverse fill signals can be further developed as follows:

In a first step, a first correlation signal is determined using optical probe signals comprising a first probe bit sequence and a first pair of inverse fill signals. In a second step, a second correlation signal is determined using optical probe signals comprising a second probe bit sequence and a second pair of inverse fill signals. Of course, the first and second pair of fill signals may be identical. The first and second probe bit sequences are unipolar complementary sequences, e.g. unipolar complementary Golay sequences. The first and second correlation signals are added in order to obtain a sum correlation signal, which is used as at least one correlation signal to determine the signal propagation delay between the near end of the optical path and the at least one reflective position. Due to the use of unipolar complementary sequences, the sum of the two correlation signals is not zero, however it has a constant value, for any shift (apart from a zero shift) between the bipolar probe bit sequence and the probe signal portion of the respective sum signal (in case of a correct detection of the receive data signals). Thus, the peak of the sum of the correlation signals can be detected more easily and with higher reliability.

The method described before can be further developed by carrying out the following steps:

At first, a first sum correlation signal is obtained as described above using the unipolar complementary sequences. Then, a second sum correlation signal is obtained in the same way using the respective bitwise inverted unipolar complementary sequences. Finally, a total sum correlation signal is obtained by subtracting the second sum correlation signal from the first sum correlation signal, wherein the total sum correlation signal is used to determine the signal propagation delay between the near end of the optical path and the at least one reflective position. In this embodiment, the use of both unipolar complementary sequences and the respective inverse complementary sequences leads to a sum correlation signal that is zero for any shift (apart from a zero shift) between the bipolar probe bit sequence and the probe signal portion of the respective sum signal (in case of a correct detection of the receive data signals).

As the correlation operation is distributive and associative (but not commutative), the same result can be obtained in the following way:

In a first step, a first sum signal is obtained using the basic sum method explained above, wherein the probe bit sequence is a first unipolar bit sequence corresponding to a first one of a pair of bipolar complementary bit sequences. In a second step, a second sum signal is obtained using the basic sum method explained above, wherein the probe bit sequence is the bitwise inverted first unipolar bit sequence. Then, a first partial correlation signal is obtained by correlating a first differential signal, which is obtained by bitwise subtracting of the second sum signal from the first sum signal, with the first one of the pair of unipolar complementary bit sequences. In a further step, a third sum signal is obtained using the basic sum method explained above, wherein the probe bit sequence is a second unipolar bit sequence corresponding to the second one of the pair of bipolar complementary bit sequences. Further, a fourth sum signal is obtained using the basic sum method explained above, wherein the probe bit sequence is the bitwise inverted second unipolar bit sequence. In a next step, a second partial correlation signal is obtained by correlating a second differential signal, which is obtained by bitwise subtracting of the fourth sum signal from the third sum signal, with the second one of the pair of unipolar complementary bit sequences. Finally, the at least one correlation signal is calculated by (bitwise) adding the first and second partial correlation signals.

Using this method, only two correlation operations are necessary instead of four correlation operations, which are required in the method described above that leads to the same result.

According to another embodiment, each of a first number of optical probe signals comprises a probe bit sequence of a first type and a fill signal of a predetermined type and each of a second number of optical probe signals comprises a probe bit sequence of a different type and a fill signal of the identical type, wherein the probe bit sequence of the second type is equal to the bitwise inverted bit sequence of the first type. According to this embodiment, a differential signal is created by bitwise averaging of the first number of digital receive data signals and bitwise averaging of the second number of digital receive data signals and bitwise subtracting of the latter of the averaged signals from the first of the averaged signals, or, in case of identical first and second numbers of optical probe signals, by bitwise adding of the first number of digital receive data signals and bitwise adding of the second number of digital receive data signals, and subtracting the latter sum signal from the first sum signal. The differential signal is then correlated with a bipolar version of the probe bit sequence. This correlation signal is used as at least one correlation signal to determine the signal propagation delay between the near end of the optical path and the at least one reflective position.

By subtracting signals comprising identical fill signals within the fill signal portion, a zero signal is obtained in this signal portion of the differential signal.

According to a further development of this embodiment, a first correlation signal is determined using optical probe signals comprising one of a first pair of probe bit sequences (which are inverse with respect to each other) and a first fill signal, and a second correlation signal is determined using optical probe signals comprising one of a second pair of probe bit sequences (which are inverse with respect to each other) and a second fill signal. Of course, the first and second fill signals may be identical. The unipolar probe bit sequences comprised by each of the first and second pairs of probe bit sequences yield a respective one of a pair of bipolar probe bit sequences if subtracted from each other. According to this embodiment, the first and second correlation signals are added in order to obtain a sum correlation signal, and the sum correlation signal is used as at least one correlation signal to determine the signal propagation delay between the near end of the optical path and the at least one reflective position.

Thus, if, in this embodiment, the unipolar probe bit sequences of both pairs of probe bit sequences are chosen in such a way that the respective bipolar bit sequences form a pair of complementary bit sequences, the respective correlation signal is zero for any shift between the respective differential signal and the respective bipolar probe bit sequence.

An optical time domain reflectometer according to the invention comprises an optical transmitter configured to create unipolar optical probe signals and to be coupled, via an optical coupling device, to a near end of an optical path under test in order to feed these probe signals to the optical path under test; an optical receiver configured to receive, via the optical coupling device, unipolar optical receive signals and to create, for at least a predetermined time interval of each optical receive signal, a digital receive data signal by sampling a respective opto-electrically converted electrical receive signal and digital-analog converting sampled values thereof; wherein the optical coupling device is configured to couple the optical probe signals received from the optical transmitter to the optical path under test and to couple at least a power portion of the optical receive signals received from the optical path under test to the optical receiver; and a control and processing device which is configured to control the optical transmitter in such a way that it creates the optical probe signals and to control the optical receiver in such a way that it creates the digital receive data signals. According to the invention, the control and processing device is configured to carry out the steps of the method according to one of the preceding claims.

That is, the invention can be implemented in many types of known OTDR systems just by modifying the control and processing device. Since the functionality of the control and processing device, especially as far as the control of the optical transmitter and the processing of the receive signal delivered by the optical receiver are concerned, is mainly determined by a respective control and processing software, the method according to the present invention does not require a specific hardware modification of existing OTDR systems. It is also possible to integrate an OTDR functionality into an optical transceiver, especially a pluggable optical transceiver, without any or with only little hardware modification.

Of course, an OTDR system according to the invention may comprise a control and processing device that comprises a storage for storing a computer program, which is configured to carry out the method according to the invention.

According to an embodiment, the control and processing device may comprise a controller device for controlling the optical transmitter and the optical transceiver and a signal processor device for processing the digital receive data signals, for carrying out the correlation operations and for determining maxima of the correlation signals that are used for determining the signal propagation delay between the near end of the optical path and the at least one reflective position.

BRIEF DESCRIPTION OF THE DRAWINGS

Further objects and advantages of the present invention will become apparent from the following description of the preferred embodiments that are given by way of example with reference to the accompanying drawings, wherein.

DESCRIPTION OF THE INVENTION

Figure 2:
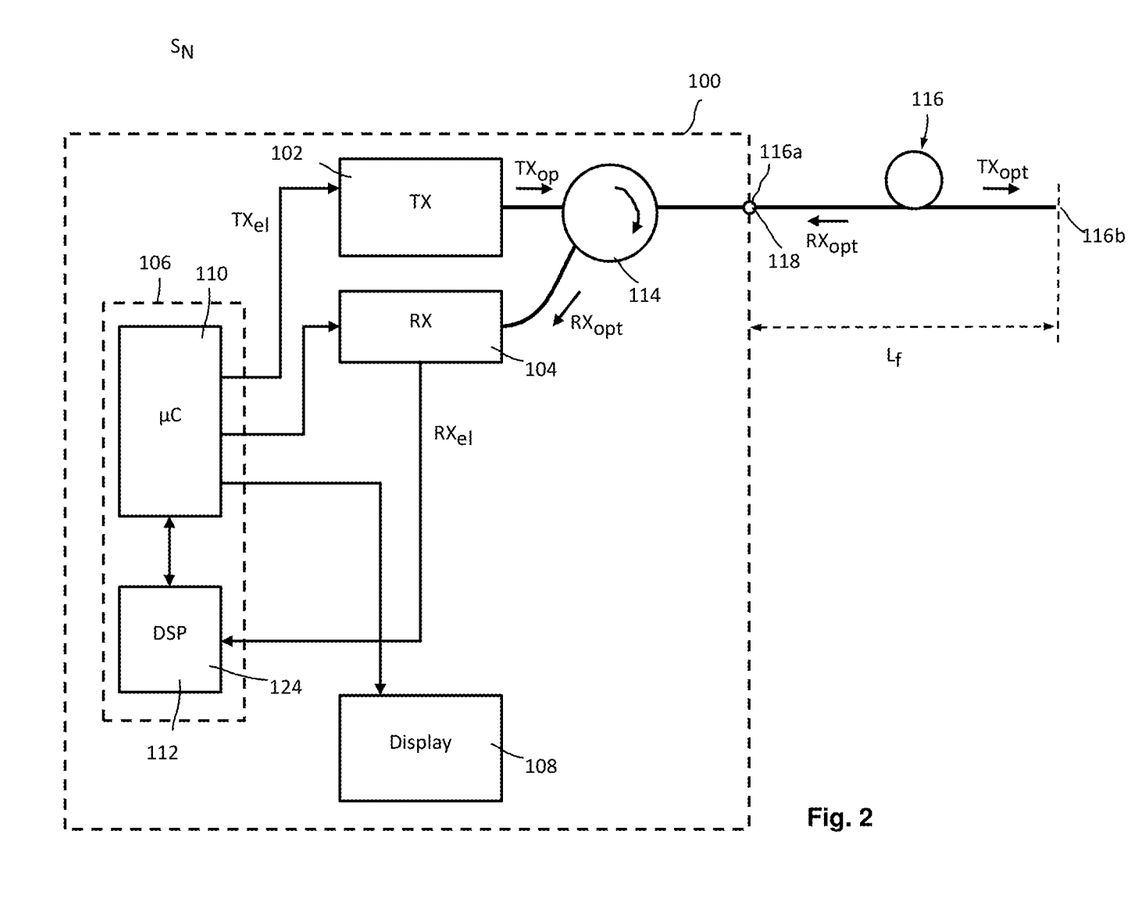
FIG. 2 shows a schematic block diagram of an OTDR system according to the present invention.

FIG. 2 shows a schematic block diagram of an OTDR system 100 according to the present invention. The optical OTDR system 100 comprises an optical transmitter 102, which is especially realized as an AC-coupled or power-controlled optical transmitter that comprises a laser. The laser may also be realized as a tunable laser so that the properties of the optical path, especially the signal propagation delay, may be determined at a desired wavelength. The disadvantage of such optical transmitters in case the electrical input signal is a burst signal has been discussed above with respect to FIG. 1.

In order to avoid this disadvantage and to enable an integration of an OTDR system into an optical transceiver that is intended for data communication (such optical transceivers, for example pluggable optical transceivers, usually comprise an AC-coupled and/or power-controlled laser), the invention uses electrical and thus optical probe signals that comprise, apart from a probe bit sequence, a full signal instead of one or more identical burst signals. In this way, inadmissibly long periods of zero signals are avoided.

The OTDR system 100 further comprises an optical receiver 104, a control and evaluation device 106 and, as the case may be, a display 108. Of course, instead of a display 108 displaying the measurement results, the respective output of the control and evaluation device 106 may be configured to deliver respective information to a further device (not shown). The control and evaluation device 106 comprises a controller device 110 for controlling the optical transmitter and the optical receiver and a signal processor device 112 for processing digital receive data signals as explained below in detail. The control and evaluation device 106 may, however, be realized in any other form or structure, for example as a single device.

The functionality of the control and evaluation device 106 may especially reside in a software or computer program, which may also be distributed to the controller device 110 and the signal processing device 112. These devices may comprise a respective storage for storing the respective software.

The control device 110 according to the embodiment shown in FIG. 2 is configured to control the optical transmitter 102 in such a way that an electrical probe signal $TX_{el}$ is fed to an input port of the optical transmitter 102. The optical transmitter 102 converts this electrical probe signal $TX_{el}$ into an optical probe signal $TX_{opt}$ that is supplied, via an optical circulator 114, to an optical path 116 under test. The optical path 116 is coupled to an input/output port 118 of the OTDR system 100.

An optical receive signal $RX_{opt}$, which may comprise reflected and/or backscattered portions of the optical probe signal $TX_{opt}$, is received at the input/output port 118 and fed, via the optical circulator 114, to an input port of the optical receiver 104. The optical receiver 104 converts the optical receive signal $RX_{opt}$ into a digital receive data signal $RX_{data}$ by sampling a respective opto-electrically converted electrical receive signal and digital-analog converting sampled values thereof. The digital receive data signal $RX_{data}$ is fed to the signal processor device 112.

The signal processing device 112 is further configured to process two or more digital receive data signals $TX_{data}$ as explained below in more detail. Especially, the signal processing device 112 calculates at least one correlation signal by correlating a processed data signal, which is based on at least two digital receive data signals, with a bipolar bit sequence that corresponds to a probe bit sequence comprised within the respective electrical $TX_{el}$ or optical $TX_{opt}$ probe signals.

From this at least one correlation signal, the signal processing device determines the signal propagation delay of the optical probe signal between the input/output port of the OTDR system 100 and the point within the optical path 116 under test at which a respective portion of the optical probe signal $TX_{opt}$ was reflected or backscattered. From this propagation delay, also the distance of the respective reflection/backscattering point, which may also be a remote end 116b of the optical path 116, from a near end 116a of the optical path 116 can be calculated using the (known) group velocity of the optical probe signal (at the specific wavelength thereof).

In this description, the term "reflect" is used to designate any type of mechanism that creates an optical signal that is guided, from a respective reflection point within or at the near or remote end of the optical path 116, in the direction to the input/output port 118 of the OTDR system 100.

The invention differs from known OTDR systems mainly with respect to the nature and structure of the probe signals and the processing of the respective digital receive data signals in order to calculate the at least one correlation function.

In order to avoid an inacceptable distortion of the optical probe signal $TX_{opt}$, the electrical and thus the optical probe signals $TX_{el}$, $TX_{opt}$ consist of a probe sequence portion and a fill signal portion. The probe sequence portion of the optical probe signal comprises a unipolar probe bit sequence as the optical transmitter 102 creates a power-modulated optical probe signal $TX_{opt}$.

The control device 110 may create the respective electrical probe signal $TX_{el}$ as a bipolar signal depending on the properties of the input port and the circuit structure at the input side of the optical transmitter 102.

The control device 110 and/or the signal processor device 112 may comprise a storage for storing the information concerning the probe bit sequence. This information can be read by the control device 110 and used to create a corresponding electrical probe signal $T_{el}$. This information can also be used by the signal processor device 112 to create a bipolar probe bit sequence that is used to calculate the at least one correlation signal. The bipolar probe bit sequence can be obtained from the respective unipolar bit sequence by mapping each 1 bit to a 1 bit and each 0 bit to a −1 bit.

The OTDR system 100 functions as follows: The control device 110 starts a measurement cycle by creating a series of electrical probe signals $T_{el}$. Each probe signal comprises a probe bit sequence within a probe bit sequence portion and a fill signal within a fill signal portion. The probe bit sequence portion may lie right in front of the fill signal portion or the probe bit sequence portion may lie between two sub-portions of a split fill signal. Generally, there is no signal "pause", i.e. a zero signal phase between two consecutive fill signal and probe signal portions or sub-portions (at any rate, a zero signal phase must be so short that the optical transmitter does not react with signal distortions of the respective optical probe signal at the end of the zero signal phase). The optical transmitter 102 converts each electrical probe signal $TX_{el}$ into a corresponding optical probe signal $TX_{opt}$, which is supplied, via the optical circulator 114, to the input/output port 118 of the OTDR system 100 and thus to the near end 116a of the optical path 116.

Simultaneously with transmitting an optical probe signal $TX_{opt}$ to the optical path 116, the controller device 110 controls the optical receiver 104 to start creating a corresponding digital receive data signal $RX_{data}$. Instead of starting the process of creating digital receive data signal $RX_{data}$ simultaneously with starting to create the optical probe signal $TX_{opt}$, the controller device 110 may be configured to delay the start of the creation of the digital receive data signal $RX_{data}$ by a predetermined time interval in order to apply "windowing", i.e. to create the digital receive data signal $RX_{data}$ only for a predetermined "time window" that corresponds to a certain section of the optical path 116.

The digital receive data signal $RX_{data}$ may comprise a plurality of digital values that are obtained by sampling an analog electrical receive signal which corresponds to the optical receive signal $RX_{opt}$. Oversampling may be applied in order to create the digital receive data signal $RX_{data}$, i.e. the (usually constant) sampling rate may be a multiple of the bit rate of the digital receive data signal $RX_{data}$ (and the optical transmit signal $RX_{opt}$). If oversampling is applied, the signal processing device 112 uses a respectively oversampled representation of the probe bit sequence to calculate a respective correlation result (see below). The signal processing device 112 uses this digital receive data signal $RX_{data}$ for further processing.

In applications in which the optical receive signal $RX_{opt}$ comprises a respective high optical energy, e.g. due to a reflection at the remote end of the optical path 116, it is possible for the signal processing device 112 to use a threshold value for assigning a binary 0 value or 1 value to each of the digital values (which comprises more than one bit per value) in order to create a binary digital receive data signal $RX_{data}$. It is also possible that the optical receiver 104 is configured to create a binary digital receive data signal which is supplied to the signal processor device 112.

The OTDR system 100, especially the controller device 110, is preferably configured to carry out a measurement in such a way that a plurality of optical probe signals $TX_{opt}$ is created and fed to the optical path 116 under test without a signal "pause", i.e. a serial signal, between consecutive optical probe signals $TX_{opt}$. At any rate, a zero signal should be so short that the optical transmitter does not react with distortions in the optical probe signal when the next electrical probe signal is supplied to the optical transmitter 102.

In the following, the measurement method will be described for embodiments in which the signal processor device 112 creates or already receives from the optical receiver 104 a binary digital receive data signal as the effect of the invention is easier to demonstrate for such embodiments.

Figure 3:
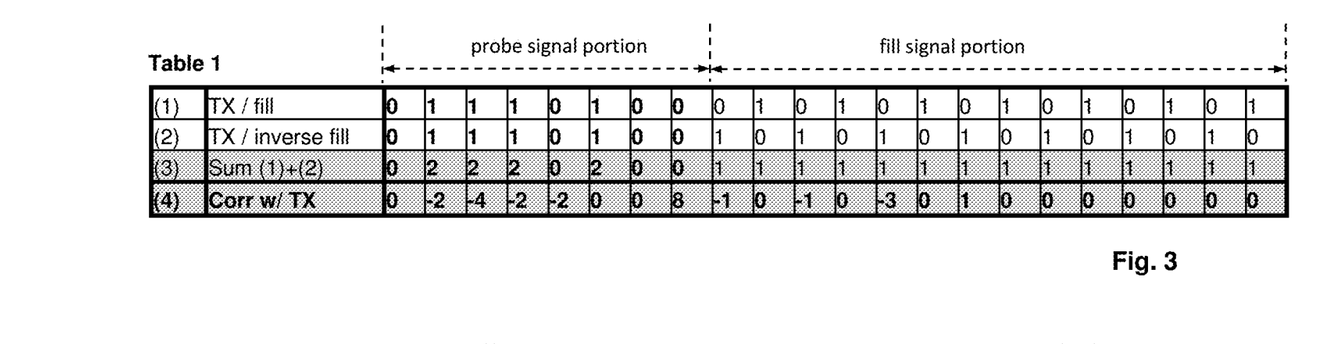
FIG. 3 shows Table 1 comprising digital signals for determining a correlation signal according to a first embodiment of the invention, wherein a first probe signal comprises a probe bit sequence and a fill signal and a second probe signal comprises the identical probe bit sequence and the inverse fill signal.

Table 1 in FIG. 3 shows, as a simplified example, the bit sequence of electrical or optical probe signals which is designated by TX. A first type of an optical probe signal shown in line (1) comprises a probe bit sequence that is comprised within a probe signal portion, having a length of eight bit. In practice, the length of the probe bit sequence may be several hundred to several thousand bits, e.g. 1024 bits. This probe signal portion is followed by a fill signal portion that comprises an alternating bit sequence. Of course, in practice, the fill signal portion may be considerably longer and may comprise, for example, several 10,000 bits.

According to the embodiment shown in FIG. 3, the OTDR system 100 creates a further type of an optical probe signal shown in line (2) which comprises the same probe bit sequence and a fill signal having a bit sequence which is inverse to the first type of an optical probe signal. Thus, according to this embodiment, the controller device 110 controls the optical transmitter 102 to create a specified number of optical probe signals $TX_{opt}$ of the first type and an identical number of optical probe signals $TX_{opg}$ of the second type.

In this embodiment, two different types of probe bit signals are used, wherein both types comprise the same probe bit sequence and an inverse bit pattern in the fill signal portion. The fill signal bit pattern should preferably be bias free (i.e. having a mark density of 50%). An alternating bit pattern (010101 . . . ; 001100110011 . . . ; 000111000111000111 . . . etc.) can be used or any other (nearly) bias free pattern like e.g. a pseudo-random bit sequence (PRBS).

Thus, as the optical receive signal $RX_{opt}$ and the digital receive data signal $RX_{data}$ also comprise the information according to these probe signals, the sum of all optical receive signals has a probe bit signal portion that comprises 1 bit only. The sum signal is shown in line (3) of Table 1, wherein this signal is the sum of the optical probe signals. However, as the receive signal comprises the identical information, in an ideal case (i.e. without detection errors due to any type of receiving problems) also the sum of the respective digital receive data signal $RX_{data}$ behaves correspondingly.

As the probe signals are preferably created without any pause, the digital receive data signals comprise the bit pattern of the fill signal portion of the preceding probe signal before the probe bit sequence of the actual probe signal is received.

If not only two probe signals are used for the measurement but an arbitrary number of 2n probe signals (wherein n is the number of probe signals of each of the two types), the sum signal comprises respectively higher values.

It would also be possible to create differing numbers of probe signals of the first and second type, wherein in such embodiments the receive signals corresponding to the first type of the probe signals and the receive signals corresponding to the second type of the probe signals must be averaged separately before the respective averaged sum signals can be added. Otherwise, the fill signal portion of the total sum signal would not be constant.

In line (4) of FIG. 3, the correlated signal (i.e. the digital values thereof) is shown. It shall be noted that, according to the invention, the correlation signal is calculated using the sum signal in line (3) of FIG. 3 and the bipolar bit sequence that corresponds to the respective probe bit sequence. The bipolar bit sequence is obtained by mapping each 1 bit of the probe bit sequence to a 1 bit and each 0 bit to a −1 bit. In the simplified example illustrated in FIG. 3, the bipolar bit sequence has the bit pattern "−1111-11-1-1" corresponding to the unipolar bit pattern "01110100" of the probe bit sequence.

As apparent from FIG. 3, in this simplified example, the correlation signal $S_{corr}$ has a main peak having a value of 8 that is preceded and succeeded by several side peaks having lower values.

Figure 5:
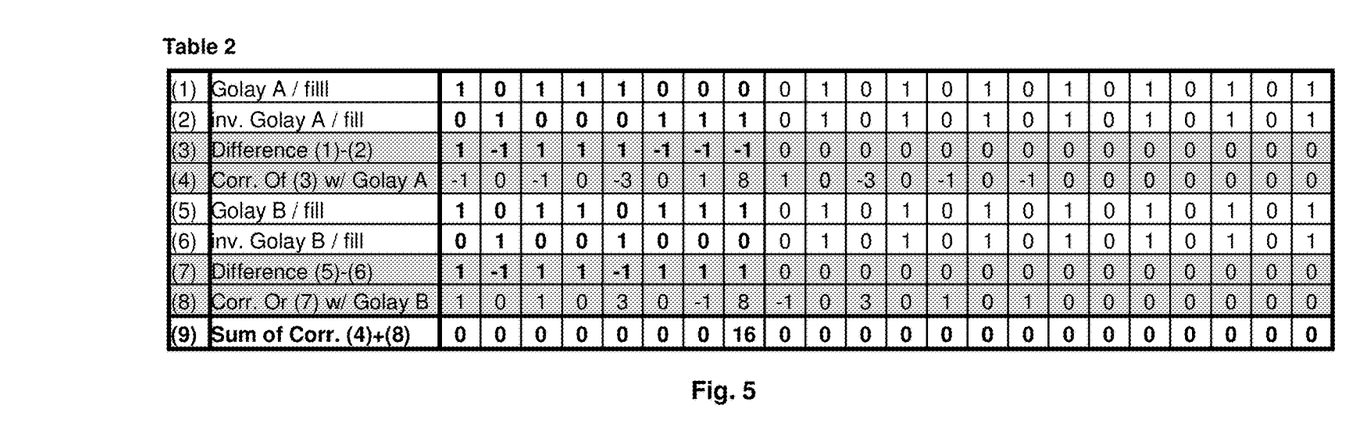
FIG. 5 shows Table 2 comprising digital signals for determining a correlation signal according to a second embodiment of the invention, wherein two pairs of probe signals are used, each pair comprising, as a probe bit sequence, a unipolar Golay sequence and its inverse form or a respective complementary unipolar Golay sequence and its inverse form, and an identical fill signal.

The mathematical operation that is carried out by the signal processing device 112 in order to realize the method illustrated in Table 2 in FIG. 5 may be described by the following equation (1)

$$S_{cor}=A_{bp}*[AF+A\overline{F}] \qquad (1)$$

wherein $S_{cor}$ designates the correlation signal, $A_{bp}$ the bipolar probe bit sequence, A the bit pattern or partial signal within the probe signal portion and F the bit pattern or partial signal, i.e. the fill signal, within the fill signal portion. The bar above the character F designates the inverse signal (i.e. the bitwise inversion) and the "·" is the cross-correlation operator.

It shall be noted that, in order to simplify the illustration, the correlation signal and the sum signal in FIG. 3 are calculated using the probe bit signals $TX_{opt}$ that are transmitted to the optical path 116. Of course, in order to carry out measurements, the digital receive data signals $RX_{data}$ are used that are obtained from the corresponding optical receive signals $RX_{opt}$. That is, the situation illustrated in FIG. 3 is an idealized situation wherein the optical receive signals are received without delay, i.e. the length of the optical path is zero and the signal propagation delay and electrical latencies within the OTDR system 100 are neglected. One could imagine that the optical probe signals are reflected at the input/output port 118 of the OTDR system 100 so that the digital receive data signal $RX_{data}$ are identical to the electrical or optical probe signals (since the signal propagation delay and electrical latencies within the OTDR system 100 are neglected). Of course, in practical measurements, there is a given delay due to the signal propagation delay, especially within the optical path 116, that is to be measured and also bit errors might occur in a digital receive data signal. However, the simplified illustration in FIG. 3 of FIG. 3 makes it possible to understand the principle of the present invention more easily.

As the evaluation of the correlation signal in order to determine the signal propagation delay of the optical probe signal(s) $TX_{opt}$ and the respective optical receive signals $RX_{opt}$ are commonly known in connection with other correlation-based OTDR systems, this functionality will not be described in detail here. The same applies to the possible functionality of a correlation-based OTDR system wherein the optical power of the optical receive signal and/or the reflectivity of a reflection point within the optical path 116 and/or the optical attenuation behavior of the optical path 116 are determined, e.g. by evaluating the height of the maximum correlation peak of the correlation signal that is determined by applying the method of the present invention.

As apparent from FIG. 3, the underlying principle is to determine a sum signal using two different types of optical probe signals wherein the two different types of optical probe signals comprise identical probe bit sequences and, with respect to each other, inverse fill signals.

Figure 4:
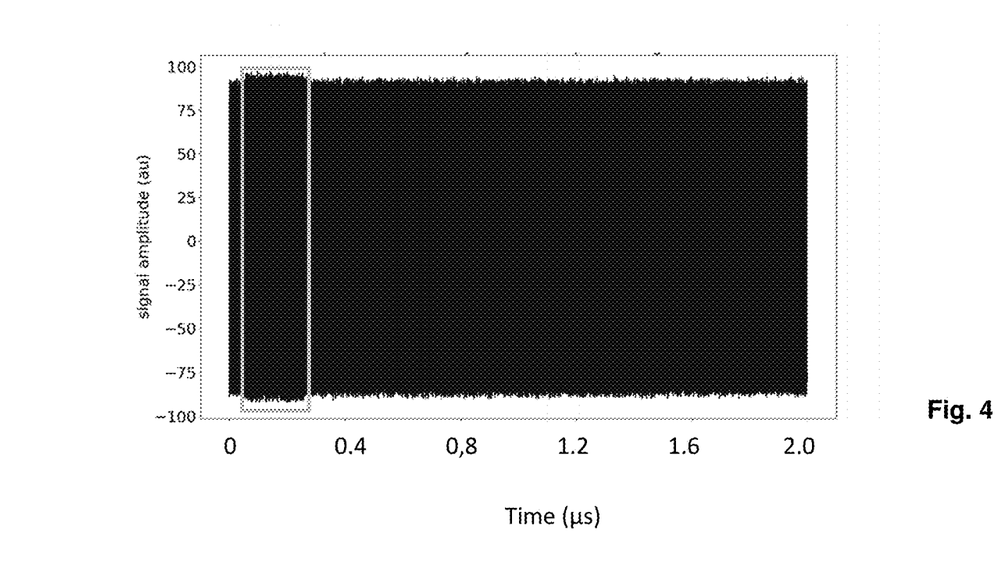
FIG. 4 shows a diagram of an optical output signal of an AC-coupled or power-controlled optical transmitter created by feeding an electrical probe signal to the input port that comprises a probe bit sequence and a fill signal.

Due to the use of fill signals, standard transceivers, which comprise an AC-coupled or power-controlled optical transmitter, may be used in order to realize a corresponding correlation-based OTDR system 100. FIG. 4 shows a diagram of an optical probe signal $TX_{opt}$ of an AC-coupled or power-controlled optical transmitter that receives an electrical probe signal $TX_{el}$ according to the invention, wherein a 2048-bit Golay sequence has been used that is followed by 20,000 alternating bits, i.e. the fill signal has a "010101 . . . " bit pattern. The time resolution in this diagram is too coarse to show the single bits. the 2048-bit sequence is included in the 2.048 µs starting at 0.1 µs (illustrated by the frame in FIG. 4). As apparent from FIG. 4, no signal distortions are created as the modulation signal, i.e. the electrical probe signal that is fed to the input port of the optical transmitter 102 does not reveal (decisive) spectral components that are below the cut-off frequency of the optical transmitter and would lead to inacceptable signal distortions.

Figure 6:
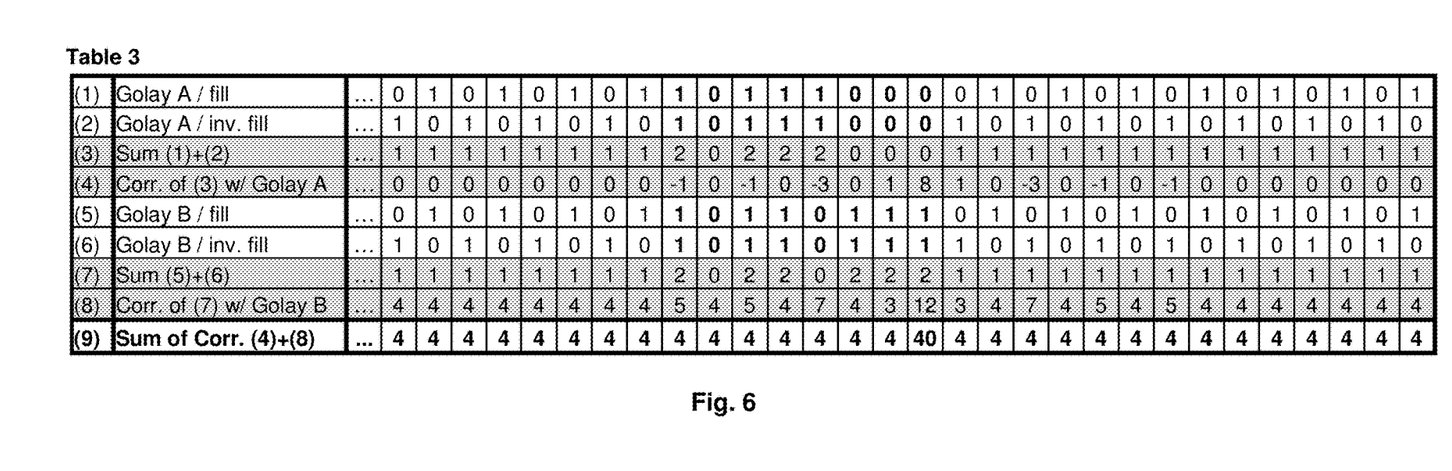
FIG. 6 shows Table 3 comprising digital signals for determining a correlation signal according to a third embodiment of the invention, wherein two pairs of probe signals are used, each pair comprising, as a probe bit sequence, a unipolar Golay sequence and its inverse form or a respective complementary unipolar Golay sequence and its inverse form, and inverse fill signals, wherein the correlation signal has constant values differing from zero for any shift between the probe signal portion of respective digital receive signals and the respective bipolar probe bit sequence.
Figure 7:
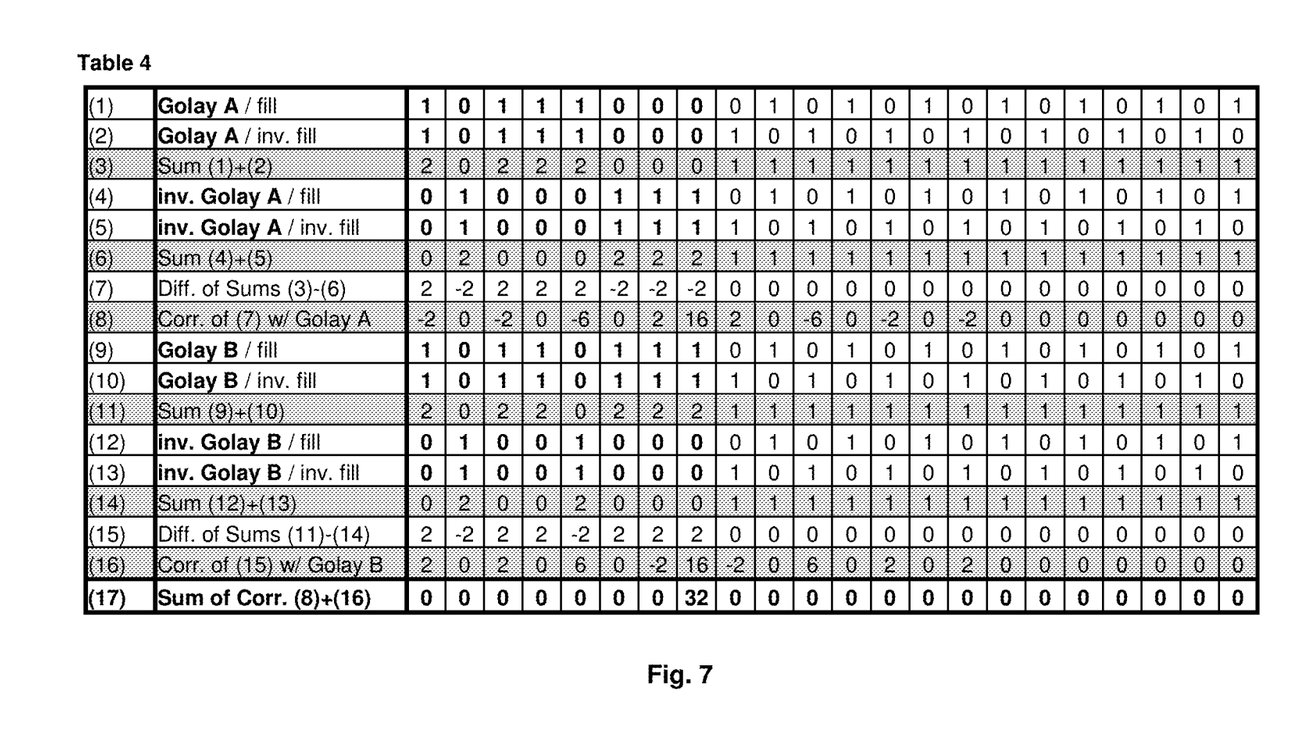
FIG. 7 shows Table 4 comprising digital signals for determining a correlation signal according to a fourth embodiment of the invention similar to the third embodiment, wherein the correlation signal is zero for any shift between the probe signal portion of respective digital receive signals and the respective bipolar probe bit sequence.

FIGS. 5, 6 and 7 illustrate further embodiments of the present invention wherein these embodiments avoid non-zero values of the (final) correlation signal that precede and succeed the main (wanted) correlation peak value. In all of these Figures, the decisive bit sequences are shown only irrespective of the fact whether or not these bit sequences are included in the optical probe signals transmitted or in the optical receive signals, i.e. the corresponding digital receive data signals. That is, the delay between the signals transmitted and the signals received is not taken into account in these illustrations.

The embodiment illustrated in Table 2 shown in FIG. 5 uses a pair of binary complementary bit sequences which have the useful property that their out-of-phase aperiodic autocorrelation coefficients sum to zero. Especially, complementary Golay sequences may be used for the present invention in order to achieve this useful effect.

However, this effect can only be fully achieved, when the transmitted sequence is bi-polar. This is not possible in case of the present invention, as generally an intensity-modulated optical signal is used. Therefore, each Golay sequence can be transmitted twice, in an original and an inverted pattern. By subtracting the trace averages obtained for each sequence, a quasi bi-polar signal is obtained, which, when correlated with the initial bipolar sequence, yields a pre- and post-cursor free system. This method is applied in the embodiment according to FIG. 5.

Here, in the simplified example illustrated in FIG. 5, the complementary bipolar Golay sequences "1-1111-1-1-1" and "1-111-1111" are used. These sequences are shown as bold sequences in lines (3) and (7) in FIG. 5. As only unipolar bit sequences can be transmitted, each of these bipolar bit sequences is obtained by transmitting two separate unipolar bit sequences which are shown in lines (1) and (2) and in lines (5) and (6), respectively. These unipolar bit sequences have the property that the difference thereof yields the respective bipolar bit sequence.

Thus, four different types of probe signals can be used in order to obtain a correlation signal that has an in-phase correlation peak only whereas all out-of-phase correlation values are 0. As apparent from FIG. 5, a first probe signal type (line (1) of FIG. 5) comprises the unipolar probe bit sequence "1011100" (Golay A) and a fill signal having the bit pattern "0101 . . . ". A second probe signal type (line (2) of FIG. 5) comprises the inverse unipolar probe bit sequence "01000111" (inverse Golay A) and a fill signal having the identical bit pattern "0101 . . . ". Thus, the corresponding difference signal (line (3) of FIG. 5) that is determined by the signal processing device 112 comprises, within the probe signal portion, the first Golay sequence "1-1111-1-1-1". Likewise, a third probe signal type (line (5) of FIG. 5) comprises the unipolar probe bit sequence "10110111" (Golay B) and a fill signal having the bit pattern "0101 . . . ". A fourth probe signal type (line (6) of FIG. 5) comprises the inverse unipolar probe bit sequence "01001000" (inverse Golay B) and a fill signal having the identical bit pattern "0101 . . . ". Again, the corresponding differential signal (line (7) of FIG. 5) that is determined by the signal processing device 112 comprises, within the probe signal portion, the second bipolar Golay sequence "1-1111-1-1-1". Since identical fill signal patterns are used, the respective differential signals comprise a zero signal in the fill signal portion.

The signal processing device 112 calculates two correlation signals, wherein a first sub-correlation signal is obtained by correlating the difference signal in line (3) with the respective bipolar Golay sequence "1-1111-1-1-1" and a second sub-correlation signal is obtained by correlating the difference signal in line (7) with the respective bipolar Golay sequence "1-111-1111". Due to the property of the complementary Golay sequences A and B, the sum signal of the sub-correlation signals shown in lines (4) and (8) of FIG. 5 merely includes a single in-phase peak (having the value 16). All other values of the sum correlation function, i.e. the out-of-phase values, are zero.

The mathematical operation that is carried out by the signal processing device 112 in order to realize the method illustrated in Table 3 shown in FIG. 6 may be described by equation (2):

$$S_{cor}=A_{bp}*[AF-\overline{AF}]+B_{bp}*[BF-\overline{BF}] \tag{2}$$

wherein $S_{cor}$ designates the (sum) correlation signal, $A_{bp}$ and $B_{bp}$ the respective bipolar Golay or complementary Golay bit sequences, A and B the bit pattern or partial signal within the probe signal portion (i.e. the respective unipolar Golay sequence) and F the bit pattern or partial signal, i.e. the fill signal, within the fill signal portion. The bar above a character designates the inverse signal (i.e. the bitwise inversion) and the "·" is the cross-correlation operator.

Of course, as explained in connection with the first embodiment illustrated in Table 1, a plurality of probe signals of each type may be used in order to achieve an averaging effect also in this embodiment and also in all further embodiments explained below. It is also possible to use different types of fill signals for the different pairs of unipolar optical probe signals. The full signal pattern must only be chosen in such a way that it does not comprise essential spectral components below the respective cut-off frequency of the optical transmitter in order to avoid distortions as explained above.

Table 3 shown in FIG. 6 illustrates a further embodiment in which also complementary Golay sequences are used. However, in contrast to the embodiment illustrated in connection with Table 2 shown in FIG. 5, only unipolar Golay sequences are used. FIG. 6 also shows that the probe signal portions may lie at any other position within the probe signal. Alternatively, FIG. 6 may be interpreted in such a way that it shows a section of two or more probe bit signals (or corresponding digital receive data signals) that are transmitted immediately in succession.

In this embodiment, in a first step, as apparent from FIG. 6, a first probe signal type (line (1) of FIG. 6) is used that comprises the unipolar probe bit sequence "10111000" (Golay A) and a fill signal having the bit pattern "0101 . . . ", and a second probe signal type (line (2) of FIG. 6) that comprises the identical unipolar Golay sequence (Golay A) and an inverse fill signal. Thus, a sum signal (line (3) of FIG. 6) that is determined by the signal processing device 112 comprises, within the probe signal portion, the bitwise doubled unipolar Golay sequence and, within the fill signal portion, a constant signal having the value 1 at each bit position. Likewise, in a following step, a third probe signal type (line (5) of FIG. 6) is used that comprises the complementary unipolar probe bit sequence "10110111" (Golay B) and a fill signal having the bit pattern "0101 . . . ", and a fourth probe signal type (line (6) of FIG. 6) that comprises the identical unipolar Golay sequence (Golay B) and an inverse fill signal. Again, a sum signal (line (7) of FIG. 6) that is determined by the signal processing device 112 comprises, within the probe signal portion, the bitwise doubled unipolar Golay sequence and, within the fill signal portion, a constant signal having the value 1 at each bit position.

The signal processing device 112 calculates again sub-correlation signals, wherein a first sub-correlation signal is calculated by cross-correlating the respective bipolar Golay sequence (i.e. the bipolar Golay sequence A equals "1-1111-1-1-1" and the bipolar Golay sequence B equals "1-111-1111") and the respective sum signal. The two sub-correlation functions are added bitwise. This leads to the sum signal shown in line (9) of FIG. 6, wherein all out-of-phase values are four and the in-phase value, i.e. the wanted peak value, is 40. Thus, even if, due to the use of only unipolar complementarity Golay sequences, the out-of-phase values of the sum of the correlation signals are not zero but reveal a constant value, this method clearly enables a simple detection of the wanted peak. The mathematical operations that have to be carried out by the signal processing device 112 may be described by the following equation (3):

$$S_{cor}=A_{bp}*[AF+\overline{AF}]+B_{bp}*[BF+\overline{BF}] \qquad (3)$$

wherein $S_{cor}$ designates the (sum) correlation signal, $A_{bp}$ and $B_{bp}$ the respective bipolar Golay or complementary Golay bit sequences, A and B the bit pattern or partial signal within the probe signal portion (i.e. the respective unipolar Golay sequence) and F the bit pattern or partial signal, i.e. the fill signal, within the fill signal portion. The bar above a character designates the inverse signal (i.e. the bitwise inversion) and the "·" is the cross-correlation operator.

Another embodiment of the method according to the invention is illustrated in Table 4 shown in FIG. 7. This method is similar to the method explained in connection with Table 2. The main difference between these embodiments is that in the embodiment according to FIG. 7 inverse fill signals are used in four pairs of types of optical probe signals.

In a first step, a first probe signal type (line (1) of FIG. 7) is used that comprises the unipolar probe bit sequence "10111000" (Golay A) and a fill signal having the bit pattern "0101 . . . ", and a second probe signal type (line (2) of FIG. 7) comprises the identical unipolar Golay sequence (Golay A) and an inverse fill signal. Thus, a sum signal (line (3) of FIG. 7) that is determined by the signal processing device 112 comprises, within the probe signal portion, the bitwise doubled unipolar Golay sequence and, within the fill signal portion, a constant signal having the value 1 at each bit position. This measurement is repeated in a second step, wherein a third probe signal type (line (4) of FIG. 7) is used that comprises the inverse unipolar probe bit sequence "01000111" (inverse Golay A) and a fill signal having the bit pattern "0101 . . . ", and a fourth probe signal type (line (5) of FIG. 7) comprises the identical inverse unipolar Golay sequence (inverse Golay A) and an inverse fill signal. Thus, a sum signal (line (6) of FIG. 7) that is determined by the signal processing device 112 comprises, within the probe signal portion, the bitwise doubled inverse unipolar Golay sequence and, within the fill signal portion, a constant signal having the value 1 at each bit position. Thus, the differential signal of the two sum signals shown in line (7) of FIG. 7 comprises, in the probe signal portion, the doubled bipolar Golay sequence A "2-2 222-2-2-2" and, in the fill signal portion, a zero signal.

These steps are repeated with the unipolar complementarity sequence Golay B (see lines (a) to line (15) of FIG. 7). Thus, the differential signal shown in line (15) of FIG. 7 comprises, in its probe signal portion, the doubled bipolar Golay sequence B "2-222-2222".

Further, the signal processor device 112 calculates a first partial correlation signal (line (8) in Table 4) by cross-correlating the differential signal shown in line (7) of FIG. 7 with the bipolar Golay sequence A and a second partial correlation signal (line (16) in FIG. 7) by cross-correlating the differential signal shown in line (15) of FIG. 7 with the complementary bipolar Golay sequence B. These two partial correlation signals are added (see line (17) in FIG. 7), wherein this sum signal shows only a single peak for the in-phase situation (value 32) and has the value 0 for any out-of-phase situation.

The mathematical operation that is carried out by the signal processing device 112 in order to realize the method illustrated in FIG. 7 may be described by equation (4):

$$S_{cor}=A_{bp}*\{[AF+A\overline{F}]-[\overline{AF}+\overline{A}\overline{F}]\}+B_{bp}*\{[BF+B\overline{F}]-[\overline{BF}+\overline{B}\overline{F}]\} \qquad (4)$$

wherein $S_{cor}$ designates the (sum) correlation signal, $A_{bp}$ and $B_{bp}$ the respective bipolar Golay or complementary Golay bit sequences, A and B the bit pattern or partial signal within the probe signal portion (i.e. the respective unipolar Golay sequence) and F the bit pattern or partial signal, i.e. the fill signal, within the fill signal portion. The bar above a character designates the inverse signal (i.e. the bitwise inversion) and the "·" is the cross-correlation operator.

As the cross-correlation operation is distributive and associative, all of the methods described above may be changed by using these properties. For example, the method according to equation 4 (Table 4) may be changed in such a way that the operations can be described by the following equation:

$$S_{cor}=A_{bp}*[AF+A\overline{F}]+B_{bp}*[BF+B\overline{F}]-\{A_{bp}*[\overline{AF}+\overline{A}\overline{F}]+B_{bp}*[\overline{BF}+\overline{B}\overline{F}]\} \qquad (5)$$

However, in order to implement this method, four complex (and thus CPU-intensive) correlation operations must be carried out instead of only two correlation operations in the method according to equation 4.

It shall be mentioned that all modifications and advantages described in connection with one of the above embodiments which are obviously applicable to any other of these embodiments may also be applied in order to realize corresponding further embodiments or variations.

LIST OF REFERENCE SIGNS

100 OTDR system
102 optical transmitter
104 optical receiver
106 control and evaluation device
108 display
110 controller device
112 signal processor device
114 optical circulator
116 optical path
116a near end
116b remote end
118 input/output port
$TX_{el}$ electrical probe signal
$TX_{opt}$ optical probe signal
$RX_{opt}$ optical receive signal
$RX_{data}$ digital receive data signal

The invention claimed is:

1. An optical time domain reflectometry method comprising the steps of
 (a) feeding a plurality of unipolar optical probe signals to a near end of an optical path under test, wherein each optical probe signal includes a single probe bit sequence of one or more differing types of probe bit sequences and wherein each optical probe signal has a predetermined length in time greater than twice the signal propagation delay between the near end and a remote end of the optical path under test,
 (b) receiving, from the near end of the optical path, a corresponding plurality of unipolar optical receive signals, wherein each optical receive signal comprises a power portion of the respective optical probe signal reflected at at least one reflective position within the optical path or at the near or remote end of the optical path,
 (c) creating, using the optical receive signals, a corresponding plurality of digital receive data signals,
 (d) calculating at least one correlation signal by correlating the digital receive data signals with a bit sequence corresponding to a respective probe bit sequence, and
 (e) determining, from the at least one correlation signal, the signal propagation delay between the near end of the optical path and the at least one reflective position, wherein:
 (f) each optical probe signal is created in such a way that it comprises, apart from a probe signal portion that comprises the respective probe bit sequence, a fill signal portion comprising a selected one of one or more differing types of optical fill signals,
 (g) two or more of the digital receive data signals or two or more averaged digital receive data signals are added or subtracted in order to form at least one sum signal comprising a resulting probe bit sequence portion and a resulting fill signal portion, wherein the bit patterns of the respective fill signals are chosen in such a way that the at least one sum signal has a constant value at each bit position of the fill signal portion, and
 (h) the at least one correlation signal is obtained by correlating the at least one sum signal with a correlation bit sequence that corresponds to the one or more probe bit sequences comprised by the digital receive data signals that have been used to create the respective sum signal.

2. The method according to claim 1, wherein the correlation bit sequence is a bipolar bit sequence that is obtained by mapping the zeros of the respective probe bit sequence to minus one and the ones to one.

3. The method according to claim 1, wherein the at least one correlation signal is obtained by correlating the each component of the at least one sum signal with the respective bipolar sequence and, taking into account the positive or negative sign of the components, adding the respective partial correlation signals instead of first obtaining the at least one sum signal and then correlating the at least one sum signal with the respective bipolar bit sequence.

4. The method according to claim 1, wherein each optical probe signal comprises the probe bit sequence in a first portion and the fill signal in a succeeding portion.

5. The method according to claim 1, wherein the optical probe signals are fed to the near end of the optical path under test as a continuous series of signals.

6. The method according to claim 1, wherein the bit pattern of each of the one or more types of optical fill signals comprises alternating groups of zeros and ones, wherein each group comprises the identical number of zeros or ones.

7. The method according to claim 1, wherein:
 (a) each of a first number of optical probe signals comprises a probe bit sequence of a predetermined type and a fill signal of a first type,
 (b) each of a second number of optical probe signals comprises a probe bit sequence of the identical type and a fill signal of a second type, wherein the fill signal of the second type is equal to the bitwise inverted fill signal of the first type, and
 (c) a sum signal is created
  (i) by bitwise averaging the first number of digital receive data signals and bitwise averaging the second number of digital receive data signals and bitwise adding the two averaged signals, or
  (ii) in case of identical first and second numbers of optical probe signals, by bitwise adding the first and second number of digital receive data signals, and
 (d) the sum signal is correlated with a bipolar version of the probe bit sequence,
 (e) this correlation signal is used as at least one correlation signal to determine the signal propagation delay between the near end of the optical path and the at least one reflective position.

8. The method according to claim 7, wherein:
 (a) a first correlation signal is determined according to the steps (a) to (d) included in claim 7 using optical probe signals comprising a first probe bit sequence and a first pair of inverse fill signals,
 (b) a second correlation signal is determined according to the steps (a) to (d) included in claim 7 using optical probe signals comprising a second probe bit sequence and a second pair of inverse fill signals,
 (c) the first and second probe bit sequences are unipolar complementary sequences, and
 (d) the first and second correlation signals are added in order to obtain a sum correlation signal, (e) the sum correlation signal is used as at least one correlation signal to determine the signal propagation delay between the near end of the optical path and the at least one reflective position.

9. The method according to claim 8, wherein a first sum correlation signal is obtained by performing the steps (a) to (d) of claim 8 using unipolar complementary sequences, that a second sum correlation signal is obtained by performing the steps (a) to (d) of claim 8 using the respective bitwise inverted unipolar complementary sequences, and that a total sum correlation signal is obtained by subtracting the second sum correlation signal from the first sum correlation signal, and wherein the total sum correlation signal is used to determine the signal propagation delay between the near end of the optical path and the at least one reflective position.

10. The method according to claim 7, wherein:
    (a) a first sum signal is obtained by performing the steps (a) to (c) of claim 7, wherein the probe bit sequence is a first unipolar bit sequence corresponding to a first one of a pair of bipolar complementary bit sequences,
    (b) a second sum signal is obtained by performing the steps (a) and (c) of claim 7, wherein the probe bit sequence is the bitwise inverted first unipolar bit sequence,
    (c) a first partial correlation signal is obtained by correlating a first differential signal, which is obtained by bitwise subtracting the second sum signal from the first sum signal, with the first one of the pair of bipolar complementary bit sequences,
    (d) a third sum signal is obtained by performing the steps (a) and (b) of claim 7, wherein the probe bit sequence is a second unipolar bit sequence corresponding to the second one of the pair of bipolar complementary bit sequences,
    (e) a fourth sum signal is obtained by performing the steps (a) and (b) of claim 7, wherein the probe bit sequence is the bitwise inverted second unipolar bit sequence,
    (f) a second partial correlation signal is obtained by correlating a second differential signal, which is obtained by bitwise subtracting the fourth sum signal from the third sum signal, with the second one of the pair of bipolar complementary bit sequences, and
    (g) the at least one correlation signal is calculated by bitwise adding the first and second partial correlation signals.

11. The method according to claim 1, wherein:
    (a) each of a first number of optical probe signals comprises a probe bit sequence of a first type and a fill signal of a predetermined type,
    (b) each of a second number of optical probe signals comprises a probe bit sequence of a different type and a fill signal of the identical type, wherein the probe bit sequence of the second type is equal to the bitwise inverted bit sequence of the first type,
    (c) a differential signal is created
        (i) by bitwise averaging the first number of digital receive data signals and bitwise averaging the second number of digital receive data signals and bitwise subtracting the latter of the averaged signals from the first of the averaged signals, or
        (ii) in case of identical first and second numbers of optical probe signals, by bitwise adding the first number of digital receive data signals and bitwise adding the second number of digital receive data signals, and subtracting the latter sum signal form the first sum signal, and
    (d) the differential signal is correlated with a bipolar version of the probe bit sequence,
    (e) this correlation signal is used as at least one correlation signal to determine the signal propagation delay between the near end of the optical path and the at least one reflective position.

12. The method according to claim 11, wherein:
    (a) a first correlation signal is determined according to the steps (a) to (d) included in claim 11 using optical probe signals comprising one of a first pair of probe bit sequences and a first fill signal,
    (b) a second correlation signal is determined according to the steps (a) to (d) included in claim 11 using optical probe signals comprising one of a second pair of probe bit sequences and a second fill signal,
    (c) the unipolar probe bit sequences comprised by each of the first and second pair of probe bit sequences are preferably chosen in such a way that they yield a pair of complementary bipolar probe bit sequences if subtracted from each other, and
    (d) the first and second correlation signals are added in order to obtain a sum correlation signal,
    (e) the sum correlation signal is used as at least one correlation signal to determine the signal propagation delay between the near end of the optical path and the at least one reflective position.

13. An optical time domain reflectometer, configured to perform the steps of the method according to claim 1, the optical time domain reflectometer comprising:
    (a) an optical transmitter configured to create the unipolar optical probe signals and to be coupled, via an optical coupling device, to the near end of an optical path under test in order to feed these probe signals to the optical path under test;
    (b) an optical receiver configured to receive, via the optical coupling device, the unipolar optical receive signals and to create, for at least a predetermined time interval of each optical receive signal, the plurality of digital receive data signals by sampling a respective opto-electrically converted electrical receive signal and digital-analog converting sampled values thereof,
    (c) wherein the optical coupling device is configured to couple the optical probe signals received from the optical transmitter to the optical path under test and to couple the at least a power portion of the optical receive signals received from the optical path under test to the optical receiver; and
    (d) a control and processing device which is configured control the optical transmitter in such a way that it creates the optical probe signals and to control the optical receiver in such a way that it creates the digital receive data signals.

14. The optical time domain reflectometer according to claim 13, wherein the control and processing device comprises a storage for storing a computer program.

15. The optical time domain reflectometer according to claim 14, wherein the control and processing device comprises a controller device for controlling the optical transmitter and the optical receiver and a signal processor device for processing the digital receive data signals, for carrying out the correlation operations and for determining maxima of the correlation signals that are used for determining the signal propagation delay between the near end of the optical path and the at least one reflective position.

16. A computer program stored on a storage medium or downloadable from a storage via a data communication network comprising instructions to cause an optical time domain reflectometer to execute the steps of an optical time domain reflectometry method,
wherein the optical time domain reflectometer comprises:
(a) an optical transmitter configured to create unipolar optical probe signals and to be coupled, via an optical coupling device, to a near end of an optical path under test in order to feed these probe signal to the optical path under test;
(b) an optical receiver configured to receive, via the optical coupling device, unipolar optical receive signals and to create, for at least a predetermined time interval of each optical receive signal, a digital receive data signal by sampling a respective opto-electrically converted electrical receive signal and digital-analog converting sampled values thereof,
(c) wherein the optical coupling device is configured to couple the optical probe signals received from the optical transmitter to the optical path under test and to couple at least a power portion of the optical receive signals received from the optical path under test to the optical receiver; and
(d) a control and processing device which is configured control the optical transmitter in such a way that it creates the optical probe signals and to control the optical receiver in such a way that it creates the digital receive data, and
wherein the optical time domain reflectometry method comprises the steps of:
(e) feeding the plurality of unipolar optical probe signals to the near end of an optical path under test, wherein each optical probe signal includes a single probe bit sequence of one or more differing types of probe bit sequences and wherein each optical probe signal has a predetermined length in time greater than twice the signal propagation delay between the near end and a remote end of the optical path under test;
(f) receiving, from the near end of the optical path, a corresponding plurality of unipolar optical receive signals, wherein each optical receive signal comprises the power portion of the respective optical probe signal reflected at at least one reflective position within the optical path or at the near or remote end of the optical path;
(g) creating, using the optical receive signals, a corresponding plurality of digital receive data signals;
(h) calculating at least one correlation signal by correlating the digital receive data signals with a bit sequence corresponding to a respective probe bit sequence; and
(i) determining, from the at least one correlation signal, the signal propagation delay between the near end of the optical path and the at least one reflective position,
wherein:
(j) each optical probe signal is created in such a way that it comprises, apart from a probe signal portion that comprises the respective probe bit sequence, a fill signal portion comprising a selected one of one or more differing types of optical fill signals,
(k) two or more of the digital receive data signals or two or more averaged digital receive data signals are added or subtracted in order to form at least one sum signal comprising a resulting probe bit sequence portion and a resulting fill signal portion, wherein the bit patterns of the respective fill signals are chosen in such a way that the at least one sum signal has a constant value at each bit position of the fill signal portion, and
(l) the at least one correlation signal is obtained by correlating the at least one sum signal with a correlation bit sequence that corresponds to the one or more probe bit sequences comprised by the digital receive data signals that have been used to create the respective sum signal.

17. The method according to claim 1, wherein each type of the optical fill signals has a bit pattern having no or a sufficiently small low-frequency component below a predetermined cut-off frequency.

18. The method according to claim 1, wherein each type of the optical fill signals has a bit pattern the mark density of which does not differ from the mark density of the respective probe bit sequence, the mark densities of the fill signal bit pattern and the probe bit sequence being determined over a time period corresponding to the inverse of a predetermined cut-off frequency.

19. The method according to claim 2, wherein the at least one correlation signal is obtained by correlating the each component of the at least one sum signal with the respective bipolar sequence and, taking into account the positive or negative sign of the components, adding the respective partial correlation signals instead of first obtaining the at least one sum signal and then correlating the at least one sum signal with the respective bipolar bit sequence.

20. The method according to claim 2, wherein each optical probe signal comprises the probe bit sequence in a first portion and the fill signal in a succeeding portion.

* * * * *